Figure 1:
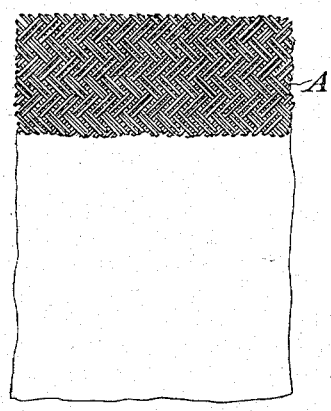

(No Model.)

A. STRAUS.
ELASTIC FABRIC.

No. 526,546. Patented Sept. 25, 1894.

Witnesses:
Raphael Netter
James N. Catton

Inventor
Alexander Straus
by Duncan & Page,
Attorneys

UNITED STATES PATENT OFFICE.

ALEXANDER STRAUS, OF NEW YORK, N. Y.

ELASTIC FABRIC.

SPECIFICATION forming part of Letters Patent No. 526,546, dated September 25, 1894.

Application filed May 4, 1894. Serial No. 510,030. (No model.)

*To all whom it may concern:*

Be it known that I, ALEXANDER STRAUS, a citizen of the United States, residing at New York, in the county and State of New York, have invented certain new and useful Improvements in Elastic Fabrics, of which the following is a specification, reference being had to the drawings accompanying and forming a part of the same.

The invention subject of my present application is an improvement in fabrics composed of a textile material and india rubber and known generally as elastic fabrics. The object of my invention has been to produce a fabric of this character which would yield or stretch in one direction only, and yet possess the strength necessary to resist tearing or bursting under any pressure or strain to which it is likely to be exposed in practical use.

The fabric which I have discovered is more especially designed for the manufacture of pneumatic or inflatable tires for cycle and other wheels, for which purpose it must not only possess the properties above stated, but it should be of such character that the tendency of the threads to chafe and wear under the severe strain to which they are subjected, will be reduced to a minimum.

In the manufacture of fabrics of this nature it has been customary to combine and unite by various processes a woven fabric and india rubber in layers; a sheet of fabric between two sheets or layers of rubber or conversely, and in various other ways. To produce fabrics which should have a greater yield in one direction than in the other it has also been usual to lay the fabrics so that the threads would run obliquely to the lines of strain, or in other words, on the bias, and to arrange the series of threads at different angles to such lines, it being obvious that the capability of yield along any given line will be greater or less according as one of the series of threads is farther from or nearer to parallelism with such line. It has also been proposed to make an elastic fabric by uniting two layers of cloth cut on the bias by means of a layer of vulcanizable compound, and in order to impart to the finished fabric a greater degree of elasticity in one direction than in the other, to strain the two layers of diagonal cloth in one direction before applying them to the vulcanizable compound. By the first method, however, it is impossible to prevent all stretch in one direction without limiting the elasticity in a direction at right angles, while the last is so difficult of execution as to be impracticable and produces a compound fabric in each layer of which the threads cross each other in contact and so as to be exposed to wear, when used for cycle tires, by rubbing and sawing upon each other.

In carrying out my invention I take any fabric such as is commonly used for this purpose and composed of interwoven threads crossing each other at substantially right angles. I then incorporate with a single thickness or layer of this fabric and while it is in its normal or unstretched condition, unvulcanized india rubber, employing the well known frictioning process, or one of similar kind that will force the rubber into the fabric between the threads or meshes as distinguished from those processes which merely result in uniting the sheet of rubber superficially with the fabric. After this is done I stretch the fabric with the unvulcanized rubber incorporated therewith in either of the directions which tend to draw its threads into parallelism and until the threads limit the yield or nearly to such point, and while in this condition, under stretch or strain I vulcanize or cure the rubber which destroys any tendency therein to return to its original shape. Thus I produce a material composed of rubber and a simple fabric which is stretched in one direction and hence incapable of further or material yield in that direction, but capable of a very great amount of stretch or yield in a direction at right angles. It will be understood that the stretching of the fabric, merely changes the angles between its threads and that it has little tendency of itself to return to its normal condition, and that it is fixed in such extended condition by the rubber, the essential feature of the improvement being that the fabric is stretched in one diagonal direction and held in such condition and with a tendency to return thereto by the elastic body of rubber incorporated therewith.

In practice the compound fabric is made in strips of greater length than width, and for this purpose the fabric is cut in diagonal strips or on the bias then incorporated into the rubber and then stretched lengthwise. Such strips it will be seen are practically non-extensible longitudinally, but laterally they may be stretched to an extent that will bring the threads of the fabric into the same relative positions but in a direction at right angles to that in which they are normally held.

In the drawings I have illustrated the invention in the serial views which will be described in their order.

Figure 2:
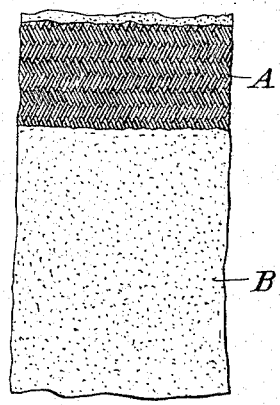
Figure 4:
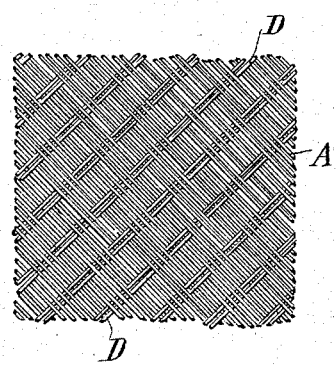
Figure 3:
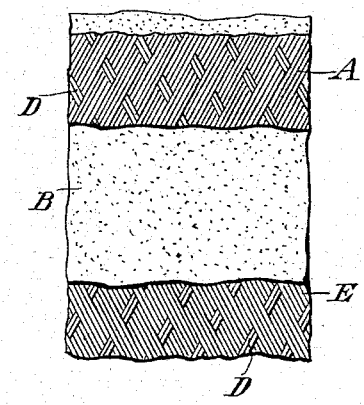

Figure 1 shows a strip of fabric A, cut on the bias and in its normal or unstretched condition. Fig. 2 represents the same when longitudinally stretched and incorporated with the india rubber B. Fig. 3 is a view showing a modified form of the invention, portions of the several layers being shown. Fig. 4 is a view of a portion of the fabric used in the material of Fig. 3.

Sometimes a fabric A like that in Fig. 4 is made and which differs from the ordinary fabrics in having practically no warp threads, or only sufficient D, to give it the semblance of a fabric but which serve no other practical purpose. When such a fabric is used in making my improved material it is necessary to use two layers of the same A and E, and in such case the two layers are embedded in and united by a sheet of rubber B which is then stretched longitudinally and vulcanized while in such condition.

Having now described my invention, what I claim is—

1. The method or process herein described of making an elastic fabric which consists in incorporating india rubber with a woven fabric then stretching the fabric diagonally in one direction, and then fixing the same in such condition by vulcanizing the india rubber, incorporated therewith.

2. The material herein described composed of a woven fabric cut on the bias and stretched in one direction, and having its threads separately embedded in a body of vulcanized india rubber incorporated with the fabric, as set forth.

ALEXANDER STRAUS.

Witnesses:
ROBT. F. GAYLORD,
JAMES N. CATLOW.